H. L. TURNEY.
LOGGING ENGINE.
APPLICATION FILED JULY 2, 1917.
1,259,173.
Patented Mar. 12, 1918.
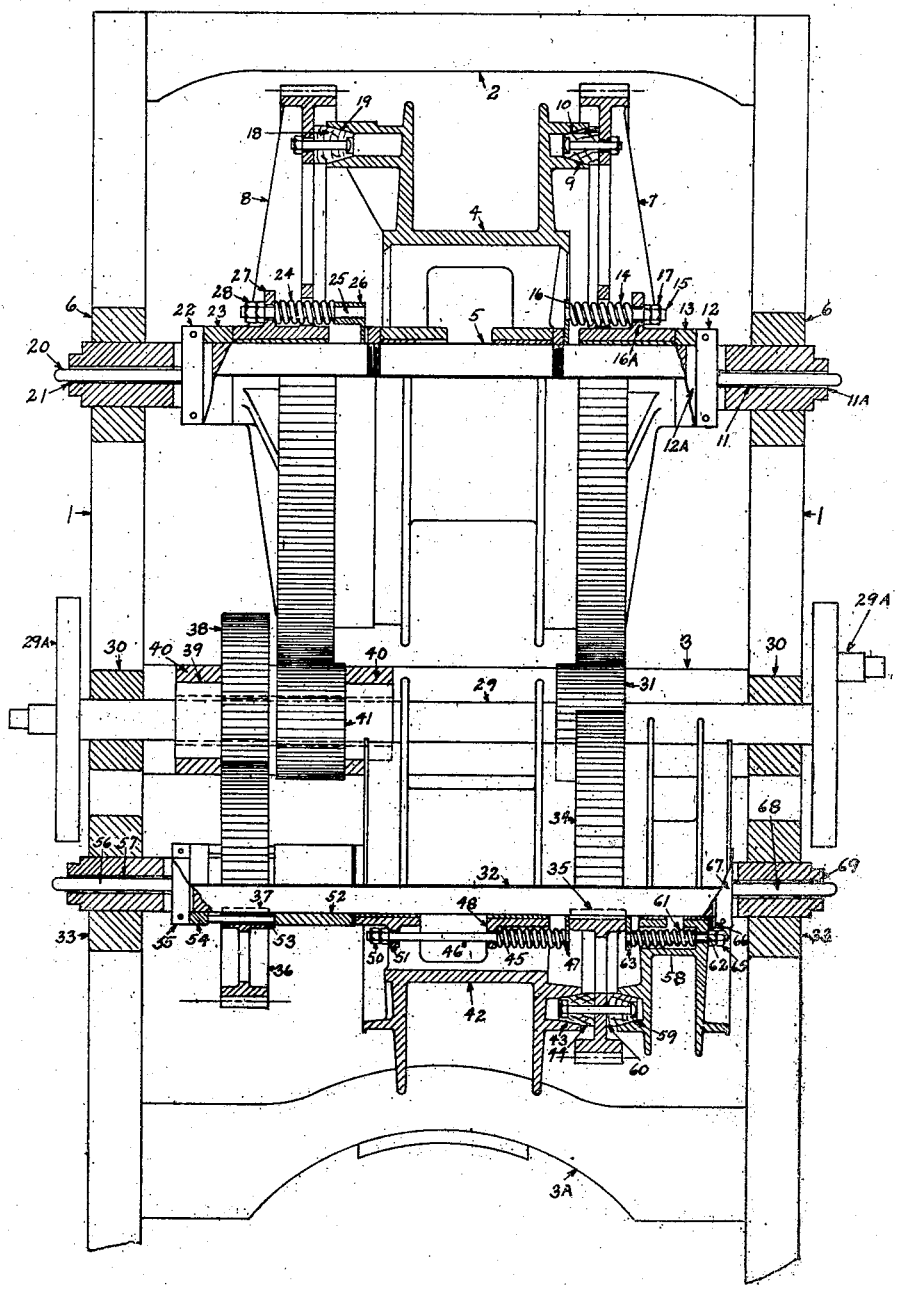

UNITED STATES PATENT OFFICE.

HARRY L. TURNEY, OF PORTLAND, OREGON.

LOGGING-ENGINE.

1,259,173.     Specification of Letters Patent.     Patented Mar. 12, 1918.

Application filed July 2, 1917. Serial No. 178,314.

*To all whom it may concern:*

Be it known that I, HARRY L. TURNEY, a citizen of the United States, residing at Portland, in the county of Multnomah and State of Oregon, have invented new and useful Improvements in Logging-Engines, of which the following is a specification.

This invention relates to logging engines and consists in certain improvements in the construction thereof as will be hereinafter fully described and pointed out in the claims.

The invention is illustrated in the accompanying drawings which show a plan view of the parts embodying the invention, parts being in section to better show construction.

The frame is made up of the side beams 1 and cross beams 2, 3 and 3ª. It will be understood that ordinarily a boiler and engine are mounted on the frame and the engines operate on the cranks of the drive shaft here shown.

The main drum 4 is mounted on the shaft 5. The shaft 5 is journaled in boxes 6 on the side beams. Drum gears 7 and 8 are also mounted on the shaft 5. The gear 7 has the cone friction surface 9 adapted to operate in the groove 10 in the flange of the drum. A thrust pin 11 extends into an axial bore 11ª in the shaft and is adapted to communicate movement from a friction actuating device (not shown) on the outer end of the shaft to the cross bar 12. The bar 12 is arranged in a slot 12ª and engages a collar 13 on the shaft 5. The collar 13 operates against the gear 7 so that when pressure is applied on the pin 11 the gear is moved to carry the cone 9 into engagement with the groove surfaces 10. This is the common manner of driving the drum. A spring 14 is arranged on a pin 15. The pin is carried by a plate 16 locked axially on the shaft and extends through the lug 16ª on the gear 7. The spring operating against the lug tends to disengage the cone from the groove surface.

A nut 17 is arranged on the end of the pin and limits the outward movement of the gear. It will be understood that there are several pins 15 with the springs.

The gear 8 is provided with a cone 18 which operates on the groove surfaces 19 on the flange of the drum. The pin 20 is arranged in the bore 21 in the shaft 5 and operates the cross bar 22. The cross bar 22 engages the collar 23 and the collar 23 is against the gear 8 so that the thrust movement of the pin 20 is communicated to the gear 8 to move the cone 18 into engagement. A spring 24 is arranged on the pin 25. The pin 25 extends from a plate 26 locked axially on the shaft and through the lug 27. The spring (with others arranged around the shaft, not shown) moves the gear 8 to disengage the clutch formed by the cone 18 and groove 19. A nut 28 limits the outward movement of the gear 8.

A drive shaft 29 is journaled in the bearings 30. It has the cranks 29ª which are a part of the engine. A gear 31 is fixed on the shaft 29 and meshes the gear 7, thus forming a direct gear connection between the drive shaft and the drum gear 7.

An intermediate shaft 32 is journaled in bearings 33 on the frame. Preferably these bearings are slightly above the frame so that the shaft 32 and its drums are above the shaft 5 and its drum.

A gear 34 is fixed on the shaft 32 by a key 35. A gear 36 is also fixed on the shaft 32 by a key 37. The gear 36 meshes a gear 38. The gear 38 is mounted on a hollow shaft 39 and the shaft 39 is journaled in bearings 40 carried in posts on the cross piece 3. A gear 41 is fixed on the shaft 39 and meshes with the gear 8. The gear 34 is larger than the gear 36 and the gear 38 larger than the gear 41 so that with the gears 7 and 8 made approximately the same size there is a decided difference in gear ratio between the direct drive between the gear 31 and gear 7 and the indirect drive between the gear 31 and gear 8. This is accomplished with comparatively small gears so that a compact frame with slight clearance can be used. In view of the fact that these engines are moved into difficult places this is important.

It will also be noted that the clutches between the gears 7 and 8 can readily be set with the engine in motion so that an immediate shift may be made while the pulling is going on.

A drum 42 is mounted on the shaft 32. It has the friction groove 43 adapted to operate on the cone 44 on the gear 34.

The spring 45 is arranged on the rod 46. The rod 46 extends from the plate 47 and through the lug 48 on the drum. The spring tends to hold the drum friction surface 43 out of engagement with the cone. A nut 50 on the rod engages the lug 51 on the drum and limits the disengaging movement of the drum.

The collar 52 is slidingly mounted on the shaft 32 and against the drum. Thrust pins 53 extend through the gear 36 and communicate movement from a collar 54 to the collar 52. A cross bar 55 extends through the shaft and is engaged by the thrust pin 56 in the bore 57 in the shaft.

It will readily be seen that when thrust movement is given to the pin 56 the drum 42 is moved to set the clutch between the drum and gear 34.

A cone 60 is arranged on the gear 34 opposite the cone 44. The cone 60 operates in a groove 59 in the drum 58. The drum 58 is mounted on the shaft 32.

A spring 61 is arranged on the pin 62. The pin 62 extends from a plate 63. The spring exerts pressure on the drum to move the friction surfaces of the cone and groove out of engagement. The outward movement is limited by the nut 65 on the pin 62.

A collar 66 is mounted on the shaft against the drum 58. A cross pin 67 communicates movement to the collar from a thrust pin 68 in the bore 69 in the shaft 32.

In operation the main drum 4 may be driven directly or indirectly as described. The drum 42 may be thrown into and out of action through the pin 56 as desired and the drum 58 thrown in and out by the pin 68.

What I claim as new is:—

1. In a logging engine, the combination of a drum; a drum shaft on which said drum is mounted; direct and indirect drum gears on said drum shaft; clutch mechanisms for locking either of said gears with said drum; a drive shaft; a direct drive gear on said drive shaft meshing the direct drum gear; a third shaft; and a gear connection through the third shaft and between the drive shaft and the indirect drum gear, the gear ratio through the gear connection and indirect drum gear being different than the gear ratio between the driving gear and the direct drum gear.

2. In a logging engine, the combination of a first drum; a first drum shaft on which the drum is mounted; a direct and a first indirect gear on said first drum shaft; clutch mechanisms for locking either of said gears with said drum; a drive shaft; a drive gear meshing the direct first drum gear; a second drum shaft; a second indirect gear fixed on said shaft and driven from the drive shaft; a second drum on said second drum shaft; a clutch for locking said drum with said second drum shaft; a third indirect gear fixed on said second drum shaft; and a gear connection between said third indirect gear and the first indirect gear, the gear ratio between the drive gear and the direct first drum gear being different than the gear ratio through the indirect gears.

3. In a logging engine, the combination of a first drum; a first drum shaft on which the drum is mounted; a direct and a first indirect gear on said first drum shaft; clutch mechanisms for locking either of said gears with said drum; a drive shaft; a drive gear meshing the direct first drum gear; a second drum shaft; a second indirect gear fixed on said shaft and driven from the drive shaft; a second drum on said second drum shaft; a clutch for locking said drum with said second drum shaft; a third indirect gear fixed on said second drum shaft; a pair of fourth indirect gears mounted concentric with the drive shaft and forming a gear connection between the third indirect gear and the first indirect gear, the gear ratio through the indirect gears being different than the gear ratio between the drive gear and the first drum gear.

4. In a logging engine, the combination of a first drum; a first drum shaft on which the drum is mounted; a direct and a first indirect gear on said first drum shaft; clutch mechanisms for locking either of said gears with said drum; a drive shaft; a drive gear meshing the direct first drum gear; a second drum shaft; a second indirect gear fixed on said shaft and driven from the drive shaft; a second drum on said second drum shaft; a clutch for locking said drum with said second drum shaft; a third indirect gear fixed on said second drum shaft; a gear connection between said third indirect gear and the first indirect gear, the gear ratio between the drive gear and the direct first drum gear being different than the gear ratio through the indirect gears; a third drum on the second drum shaft at the opposite side of the second indirect gear from the second drum; and a clutch mechanism for locking said third drum with the second drum shaft.

5. In a logging engine, the combination of a first drum; a first drum shaft on which the drum is mounted; a direct and a first indirect gear on said first drum shaft; clutch mechanisms for locking either of said gears with said drum; a drive shaft; a drive gear meshing the direct first drum gear; a second drum shaft; a second indirect gear fixed on said shaft and driven from the drive shaft; a second drum on said second drum shaft; a clutch for locking said drum with said second drum shaft; thrust mechanism for said clutch operating through one of the gears on said shaft; a third indirect gear fixed on said second drum shaft; and a gear connection between said third indirect gear and the first indirect gear, the gear ratio between the drive gear and the direct first drum gear being different than the gear ratio through the indirect gears.

In testimony whereof I have hereunto set my hand.

HARRY L. TURNEY.